United States Patent
Iizuka

[19]

[11] Patent Number: 6,091,533
[45] Date of Patent: Jul. 18, 2000

[54] REFLECTION TYPE SCANNING OPTICAL SYSTEM

[75] Inventor: Takashi Iizuka, Saitama-ken, Japan

[73] Assignee: Asahi Kogaku Kogyo Kabushiki Kaisha, Tokyo, Japan

[21] Appl. No.: 09/110,658

[22] Filed: Jul. 7, 1998

[30] Foreign Application Priority Data

Jul. 11, 1997 [JP] Japan .................................. 9-202246

[51] Int. Cl.$^7$ .................................................. G02B 26/08
[52] U.S. Cl. ........................ 359/208; 359/205; 359/212; 359/216
[58] Field of Search ........................... 359/208, 216–219, 359/505, 868, 869, 212

[56] References Cited

U.S. PATENT DOCUMENTS

| | | | |
|---|---|---|---|
| 5,353,047 | 10/1994 | Nakamura et al. ...................... | 359/208 |
| 5,572,353 | 11/1996 | Iizuka et al. . | |
| 5,583,559 | 12/1996 | Nakamura et al. ...................... | 359/208 |
| 5,751,464 | 5/1998 | Yoshikawa et al. ...................... | 359/208 |
| 5,812,298 | 9/1998 | Ono ......................................... | 359/208 |

FOREIGN PATENT DOCUMENTS 62-253116  11/1987  Japan .

*Primary Examiner*—James Phan
*Attorney, Agent, or Firm*—Greenblum & Bernstein, P.L.C.

[57] ABSTRACT

Disclosed is a scanning optical system, which is provided with a light source that emits a light beam, a deflector that deflects the light beam emitted by the light source to scan along a main scanning direction, and a single mirror that reflects the light beam deflected by the deflector towards a surface to be scanned. The single mirror is arranged such that the light beam deflected by the deflector and is incident on the single mirror and a light beam reflected by the single mirror forms a predetermined angle in the auxiliary scanning direction. Further, the single mirror is formed to have a positive power both in the main scanning direction and in the auxiliary scanning direction, and a shape of the single mirror is asymmetric in the auxiliary scanning direction with respect to a reference line which extends in the main scanning direction and intersects an optical axis thereof.

8 Claims, 6 Drawing Sheets

REFLECTION TYPE SCANNING OPTICAL SYSTEM

BACKGROUND OF THE INVENTION

The present invention relates to a scanning optical system to be employed in a laser beam printer or the like, and more particularly, to a reflection type scanning optical system in which a curved mirror is disposed instead of an fθ lens between a deflector and an imaging surface (i.e., a surface to be scanned).

An example of a reflection type scanning optical system is disclosed in Japanese Patent (JP) Provisional Publication No. SHO 62-253116. In the scanning optical system disclosed in the JP publication, a beam emitted from a light source is deflected by a polygonal mirror on a plane including the incident beam. The deflected beam is reflected by a curved mirror in a direction crossing a plane including the deflected beam to proceed towards a photoconductive drum. The curved mirror is formed such that an incident angle of the deflected beam gradually increases from a center toward a periphery so that the beam draws a linear locus on the photoconductive drum.

In order to provide a single curved mirror instead of an fθ lens which is generally employed in a scanning optical system, the curved mirror should have at least a function of correcting distortion and a function of correcting curvature of field in an auxiliary scanning direction, and also in a main scanning direction, to realize fθ characteristics. Further, when a polygonal mirror is employed, it is required that the curved mirror has a function of correcting a surface tilting error (the error caused by the tilting of the reflection surfaces of the polygonal mirror in the auxiliary scanning direction) of the polygonal mirror. In summary, the curved mirror is required to have a power in the auxiliary scanning direction in order to correct at least the curvature of field in the auxiliary scanning direction and the surface tilting error with remaining an excellent optical performance.

In the scanning optical system disclosed in the above JP publication, however, the degree of freedom in designing an optical system is relatively low since the curved mirror does not have functions of correcting the curvature of field in the auxiliary scanning direction or the surface tilting error of the polygonal mirror.

SUMMARY OF THE INVENTION

It is therefore an object of the invention to provide an improved reflection type scanning optical system capable of obtaining an excellent optical performance only with a single curved mirror.

For the above purpose, according to the present invention, there is provided a scanning optical system, comprising: a light source that emits a light beam; a deflector that deflects the light beam emitted by the light source to scan along a main scanning direction; a single mirror that reflects the light beam deflected by the deflector towards a surface to be scanned, wherein the single mirror is arranged such that the light beam deflected by the deflector and is incident on the single mirror and a light beam reflected by the single mirror forms a predetermined angle in the auxiliary scanning direction, wherein the single mirror is formed to have a positive power both in the main scanning direction and in the auxiliary scanning direction, and wherein a shape of the single mirror is asymmetric in the auxiliary scanning direction with respect to a reference line which extends in the main scanning direction and intersects an optical axis thereof.

Optionally, the single mirror may be formed such that an incident angle of the light beam deflected by the deflector in the auxiliary scanning direction changes in accordance with a distance, in the main scanning direction, from the optical axis to a point at which the light beam is incident.

Further optionally, when a three-dimensional coordinate system defined by a y-axis extending in the main scanning direction, a z-axis extending in the auxiliary scanning direction, and an x-axis orthogonal to the y-axis and z-axis is given, and when a sag amount, which represents a reflection surface of the mirror, in the x-axis direction with respect to a y-z plane is expressed by a function f(y, z) with respect to y and z coordinates, a condition:

$$0.005 < |g(0.8P,0) - g(0.0)| < 0.025$$

is satisfied,
wherein $$g(y, z) = \frac{\partial}{\partial z} f(y, z),$$

and
wherein, P represents a distance between the deflector and the single mirror.

Optionally, the function f(y, z) is a two-dimensional polynomial with respect to y and z.

In particular, the light beam emitted from the light source and incident on the deflector is a parallel beam in the main scanning direction.

Alternatively, wherein the light beam emitted from the light source and incident on the deflector is a diverging beam in the main scanning direction.

Still optionally, the deflector is a polygonal mirror having a plurality of reflecting surfaces each of which is formed to have a curved shape.

Further, each of the reflecting surfaces may be a cylindrical surface having a curvature only in the main scanning direction.

In particular, each of the reflecting surface has a negative power in the main scanning direction.

Further more, a condition:

$$0.2 < \left|\frac{P}{rm'}\right| < 0.4$$

is satisfied,
wherein, P represents a distance from the deflector to the single mirror, and rm, represents an effective radius of curvature, in the paraxial region, of the single mirror in the main scanning direction, rmt being defined by an equation:

$$\frac{1}{rm'} = \frac{1}{rm} + 2A_2$$

wherein, a sag amount in the x-axis direction is expressed by a function f(y, z) which is a two-dimensional polynomial with respect to y and z, $A_2$ is a coefficient of a term of $y^2$ of the function f(y, z), and rm represents a radius of curvature, in the paraxial region, of the curved mirror in the main scanning direction.

DESCRIPTION OF THE PREFERRED EMBODIMENTS

Scanning optical systems embodying the invention will be described hereinafter with reference to the accompanying drawings.

Figure 1:
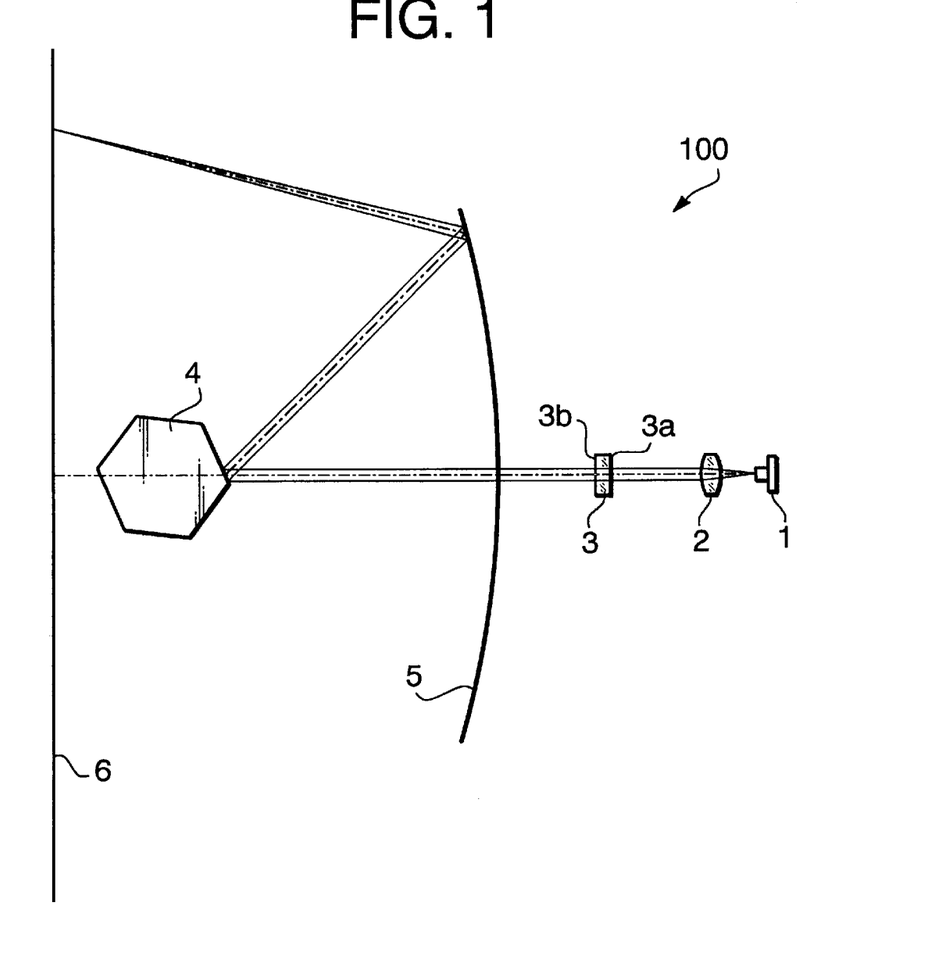
FIG. 1 is a plan view, showing a main scanning plane, of a reflection type scanning optical system according to a first embodiment of the invention.
Figure 2:
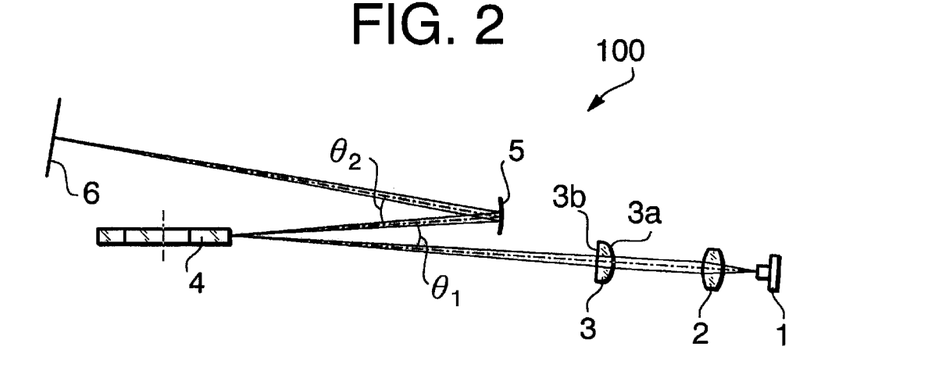
FIG. 2 is a side view, showing an auxiliary scanning plane, of the reflection type scanning optical system shown in FIG. 1.

FIG. 1 shows a plan view of the scanning optical system 100 to which a first numerical example (described later) is applied, and FIG. 2 shows a side view of the scanning optical system 100.

In the scanning optical system 100, a laser beam emitted from a laser diode 1 is converted into a parallel beam by a collimating lens 2, converged in the auxiliary scanning direction by a cylindrical lens 3 which has a positive power only in the auxiliary scanning direction, and incident on a polygonal mirror 4. The beam is converged, in the auxiliary scanning direction, in the vicinity of a reflection surface of the polygonal mirror 4. Thus, a line-like image, which extends in a main scanning direction, is formed in the vicinity of the reflection surface of the polygonal mirror 4. The beam is reflected on the reflecting surface of the polygonal mirror 4 and is directed to a curved mirror 5. Then, the beam is reflected by the curved mirror 5, and a beam spot is formed on a surface 6 to be scanned, such as a photoconductive drum or the like. The surface 6 is scanned with the beam spot, i.e., the beam spot moves on the surface 6, in the main scanning direction as the polygonal mirror 4 rotates.

In this specification, the term "optical axis of a scanning optical system" is defined as the axis which coincides with the principal ray of the beam when the beam spot is positioned at the center of a scanning range (i.e., a range subjected to be scanned) on the scanning surface 6. Further, the term "main scanning direction" is defined as the direction which corresponds to the scanning direction of the beam spot on the surface 6 on a plane perpendicular to the optical axis of the scanning optical system. The term "auxiliary scanning direction" is defined as the direction crossing the main scanning direction at right angle on a plane perpendicular to the optical axis of the scanning optical system.

The collimating lens side surface 3a of the cylindrical lens 3 is a cylindrical surface having a positive power only in the auxiliary scanning direction, while the polygonal mirror side surface 3b thereof is a flat surface. A line-shaped image extending in the main scanning direction is formed by the cylindrical lens 3 in the vicinity of the reflecting surface, which faces the cylindrical lens 3, of the polygonal mirror 4.

The polygonal mirror 4 is arranged such that the beam directed from the laser diode 1 is reflected at a first separating angle θ1 in the auxiliary scanning direction. That is, the beam incident on the reflecting surface of the polygonal mirror 4 and the reflected beam form the first separating angel θ1 in the auxiliary scanning direction. The beam reflected by the polygonal mirror 4 is incident on the curved mirror 5. It should be noted that the beam incident on the curved mirror 5 is a substantially parallel beam in the main scanning direction, while, in the auxiliary scanning direction, the beam is a diverging beam. The reflection surface of the curved mirror 5 is formed to have a positive power in both the main scanning direction and the auxiliary scanning direction so as to converge the beam on the surface 6 to be scanned.

The curved mirror 5 is disposed such that the beam directed from the polygonal mirror 4 and incident thereon is reflected at a second separating angle θ2 in the auxiliary scanning direction. That is, the beam incident on the curved mirror 5 and the reflected beam form the second separating angle θ2 in the auxiliary scanning direction. The curved mirror 5 is formed to have a shape which is asymmetrical in the auxiliary scanning direction with respect to a reference line which extends in the main scanning direction and intersects the optical axis of the scanning optical system 100.

Generally, when the light is incident on the curved mirror 5 at a certain separating angle in the auxiliary scanning direction, the locus of the light on the curved mirror 5 is curved, which results in curvature of the scanning line on the surface 6 to be scanned.

To avoid the above deficiency, in the scanning optical system 100, the reflection surface of the curved mirror 5 is formed such that the curved mirror 5 is asymmetrical in the auxiliary scanning direction with respect to the reference line, and the angle in the auxiliary scanning direction at which the light is incident on the curved mirror 5 varies in accordance with the distance from the optical axis of the scanning optical system 100 in the main scanning direction. By forming the reflection surfaces of the curved mirror 5 as described above, curvature of the scanning line can be corrected.

Correction of the fθ characteristic is done by making the incident angle of the light upon the curved mirror 5 in the main scanning direction to be substantially proportional to the distance of the beam spot from the scanning center on the scanning surface 6. This can be achieved by forming the curved mirror 5 to have a negative distortion in the main scanning direction.

The surface tilting error of the polygonal mirror 4 can be corrected by converging the light on the polygonal mirror 4 in the auxiliary scanning direction, and making the reflection surface of the polygonal mirror 4 and the scanning surface 6 to have a substantially conjugate relationship. The cylindrical lens 3 is provided for this purpose, i.e., for converging the beam in the vicinity of the reflection surface of the polygonal mirror 4 in the auxiliary scanning direction, and the curved mirror 5 has a positive power in the auxiliary scanning direction.

Given that a y-axis extends in the main scanning direction, a z-axis extends in the auxiliary scanning direction and an x-axis is an axis orthogonal to these two axes, the shape of the curved mirror 5 is represented by a sag amount f(y, z), in the x-axis direction, from a y-z plane, wherein y and z of the function f(y, z) are a y-coordinate and a z-coordinate, respectively. The function f(y, z) is expressed by a two-dimensional polynomial function with respect to the coordinates y and z.

The reflection surface of the curved mirror 5 satisfies the following condition (1) when the distance from the polygonal mirror 4 to the curved mirror 5 is represented by P:

$$0.005 < |g(0.8P,0) - g(0.0)| < 0.025 \quad (1)$$

where, $$g(y, z) = \frac{\partial}{\partial z} f(y, z) \quad (2)$$

Equation (2), i.e., the partial differentiation of the sag amount f(y, z) with respect to z represents the inclination of the curved mirror 5 in the auxiliary scanning direction. Therefore, the condition (1) prescribes the difference between the inclination of the curved mirror 5 when y=0 and the inclination thereof when y=0.8P (i.e., the inclination on the peripheral portion). In other words, condition (1) prescribes the amount of twist of the reflection surface of the curved mirror 5. When condition (1) is satisfied, the curvature of the scanning line on the reflection surface of the curved mirror 5 can be suppressed to a sufficiently small amount.

The function f(y, z) which represents the shape of the curved mirror 5 (the sag amount x) will be expressed by formula (3) indicated below:

$$x = f(y, z) = \frac{ch^2}{1 + \sqrt{1 - (K+1)c^2 h^2}} + \sum_{n=0}\sum_{m=0} B_{m,n} \cdot y^m \cdot z^n \quad (3)$$

wherein, $$h^2 = y^2 + z^2 \quad (4)$$

In formula (3), a symbol c represents a curvature (1/ry) of the curved mirror 5 in the main scanning direction at a point where the optical axis intersects the reflection surface thereof, and a symbol K represents a conical coefficient.

The formula (3) can also be rewritten as follows.

$$X = Xa + Xb \quad (5)$$

where, $$Xa = \frac{c(y^2 + z^2)}{1 + \sqrt{1 - (K+1)c^2(y^2 + z^2)}} \quad (6)$$

-continued $$Xb = \sum_{n=0}\sum_{m=0} B_{m,n} \cdot y^m \cdot z^n \quad (7)$$

From equation (5), a function g(y, z), which is a partial differentiation of function f(y, z) with respect to z can be expressed as follows.

$$g(y, z) = \frac{\partial x}{\partial z} = \frac{\partial}{\partial z} Xa + \frac{\partial}{\partial z} Xb \quad (8)$$

The fist and second terms of the right side of the equation (8) can be expressed as follows.

$$\frac{\partial}{\partial z} Xa = \frac{2cz}{1 + \sqrt{1 - (K+1)c^2(y^2 + z^2)}} - \frac{(y^2 + z^2)(K+1)c^3 z}{\sqrt{1 - (K+1)c^2(y^2 + z^2)} \left\{ 1 + \sqrt{1 - (K+1)c^2(y^2 + z^2)} \right\}^2} \quad (9)$$

$$\frac{\partial}{\partial z} Xb = \sum_{n=1}\sum_{m=0} B \cdot y^m \cdot n z^{n-1} \quad (10)$$

The value of the right side of the equation (9) equals 0 (zero) when z=0. That is, on the reference line extending in the main scanning direction and intersecting the optical axis, the right side of the equation (9) is 0. Accordingly, only the second term of equation (8) (i.e., the partial differentiation of Xb with respect to z) is to be taken into consideration to determine the inclination.

Therefore, the inclination can be expressed by equation (11) below.

$$\frac{\partial x}{\partial z} = \sum_{m=0} B_{m,1} \cdot y^m \quad (11)$$

Further, the optical system 100 satisfies the following condition (12).

$$0.2 < \left| \frac{P}{rm'} \right| < 0.4 \quad (12)$$

Where, P represents the distance from the polygonal mirror 4 to the curved mirror 5, rm' represents the effective radius of curvature of the curved mirror 5, in the paraxial region, in the main scanning direction. It should be noted that, when the function f(y, z) is a polynomial with respect to y and z and a coefficient of a term of $y^2$ is A2 which equals $B_{20}$, the radius rm' is obtained in accordance with equation (13) below:

$$\frac{1}{rm'} = \frac{1}{rm} + 2A_2 \quad (13)$$

where, rm is a radius of curvature of the curved mirror 5 in the main scanning direction.

Condition (12) expresses a relationship between the position of the curved mirror 5 and the radius of curvature thereof. Assuming that the scanning range in the main scanning direction is fixed, the size of the curved mirror 5 is bigger as the distance P from the polygonal mirror 4 to the curved mirror 5 is greater. Therefore, in order to reduce the size of the optical system from the light source to the curved mirror 5, it is preferable to make the distance P as short as possible. In view of an optical performance, however, it is preferable that the distance P is made as long as possible since degree of freedom in correcting aberrations is larger as the width of the curved mirror 5 in the main scanning direction is greater.

When condition (12) is satisfied, reducing of the size of the optical system and an excellent optical performance can be achieved. When |P/rm'| is smaller than the lower limit of the condition (12), the excellent optical performance cannot be obtained, whereas when |P/rm'| exceeds the upper limit of condition (12), the size of the optical system becomes greater.

When the distance P is relatively large, the light beam incident on the curved mirror 5 can be a parallel light beam as in a case where an fθ lens is used. In this case, the power of the curved mirror 5 in the main scanning direction bears the function of converging the parallel light beam onto the scanning surface 6 and the function of correcting aberration.

When the distance P is relatively short, even if the curved mirror 5 has a power for converging the parallel light beam onto the scanning surface in the main scanning direction, aberrations may not be corrected with the power of the curved mirror 5. In such case, by forming the curved mirror 5 to have a stronger positive power than the power for converging the parallel light beam, and by making a diverging beam incident on the curved mirror 5, the aberration can be corrected.

In order to make the light beam incident on the curved mirror 5 to be a diverging beam, a topic lens having a negative power in the main scanning direction can be used instead of the cylindrical lens. Alternatively or optionally, the reflection surfaces of the polygonal mirror may be formed to be a cylindrical surface so that each of is the reflection surfaces has a negative power in the main scanning direction.

Hereinafter, three numerical examples will be described, each satisfying conditions described above.

In example 1, the distance p from a polygonal mirror to a curved mirror is relatively long so that it has an excellent drawing performance. In example 3, the distance p is relatively short to achieve a compactness of the optical system. Example 2 is and example considered to be an intermediate between examples 1 and 2.

In all the examples, the first separating angle θ1 is 4.0, and the second separating angle θ2 is 7.0.

EXAMPLE 1

Example 1 is applicable to the scanning optical system 100 shown in FIGS. 1 and 2.

Table 1 shows a numerical structure of the first example of the reflection type scanning optical system 100 on the scanning surface side of the cylindrical lens 3.

In Table 1, ry represents a radius of curvature in the main scanning direction, rz represents a radius of curvature in the auxiliary scanning direction, d represents a distance between surfaces on an optical axis, and n represents a refractive index at a wavelength of 780 nm.

In Table 1, surface numbers 1 and 2 represent the cylindrical lens 3, a surface number 3 represents the polygonal mirror 4 and a surface number 4 represents the curved mirror 5. Further, in Table 1, the radius of curvature ry of the curved mirror 5 in the main scanning direction is that on the optical axis.

TABLE 1

| Surface # | ry | rz | d | n |
|---|---|---|---|---|
| 1 | ∞ | 55.424 | 2.000 | 1.48617 |
| 2 | ∞ | ∞ | 113.000 | |
| 3 | ∞ | ∞ | 84.000 | |
| 4 | −270.910 | * | 135.455 | |

The shape of the reflection surface of the curved mirror 5 is defined by the formula (3). In example 1, the conical coefficient K is 0, the curvature c is $1/ry = 3.69 \times 10^{-03}$, and values of the coefficients $B_{m,n}$ are shown in Table 2.

TABLE 2

| $B_{m,n}$ | n = 0 | n = 1 | n = 2 | n = 3 | n = 4 |
|---|---|---|---|---|---|
| m = 0 | 0.00 | 0.00 | $-2.93 \times 10^{-03}$ | 0.00 | $2.60 \times 10^{-07}$ |
| m = 2 | $-8.77 \times 10^{-06}$ | $3.14 \times 10^{-06}$ | $-6.70 \times 10^{-08}$ | 0.00 | $1.80 \times 10^{-11}$ |
| m = 4 | $7.80 \times 10^{-09}$ | $-2.50 \times 10^{-10}$ | $1.60 \times 10^{-12}$ | 0.00 | 0.00 |
| m = 6 | $-5.18 \times 10^{-13}$ | $1.36 \times 10^{-13}$ | $-1.70 \times 10^{-16}$ | 0.00 | 0.00 |
| m = 8 | $1.04 \times 10^{-16}$ | $-2.50 \times 10^{-17}$ | $-2.10 \times 10^{-19}$ | 0.00 | 0.00 |
| m = 10 | $-7.12 \times 10^{-21}$ | $1.49 \times 10^{-21}$ | $3.40 \times 10^{-23}$ | 0.00 | 0.00 |
| m = 12 | 0.0 | 0.0 | 0.0 | 0.00 | 0.00 |

Figure 3A:
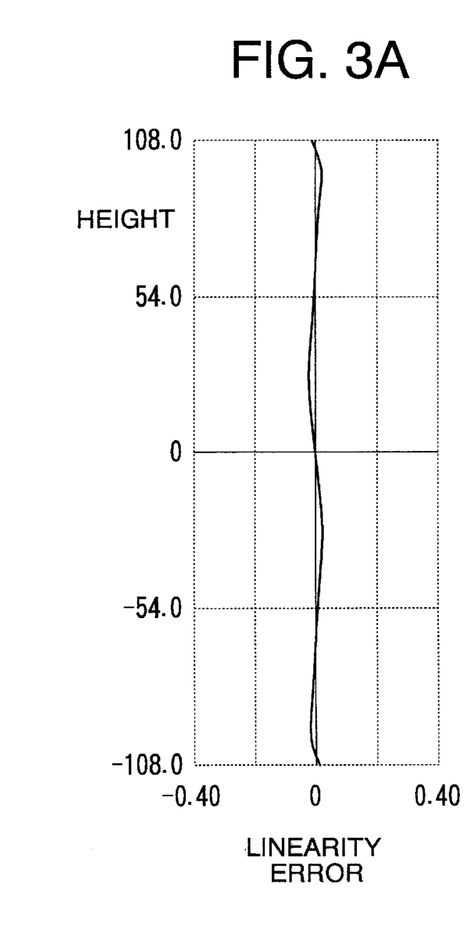
FIG. 3A is a graph showing a linearity error.
Figure 3B:
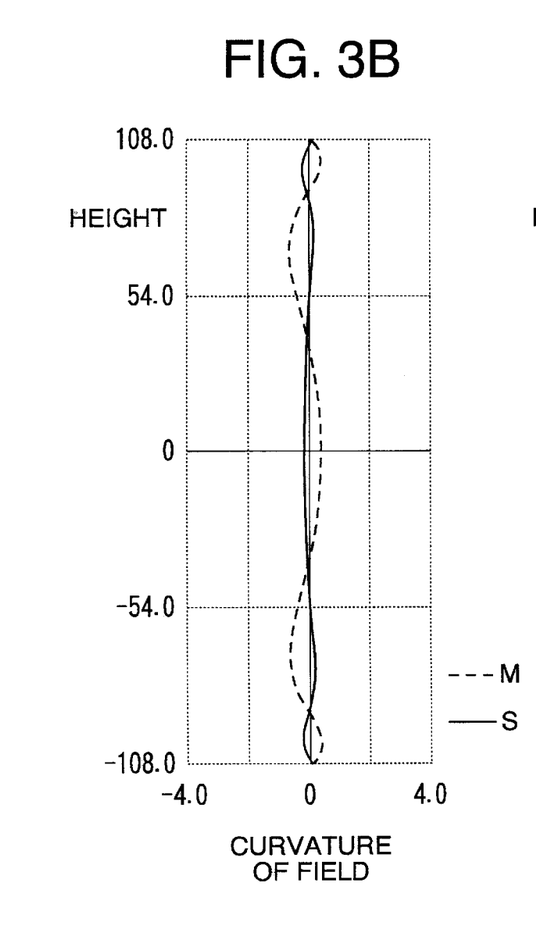
FIG. 3B is a graph showing curvature of field in a main scanning direction and an auxiliary scanning direction.
Figure 3C:
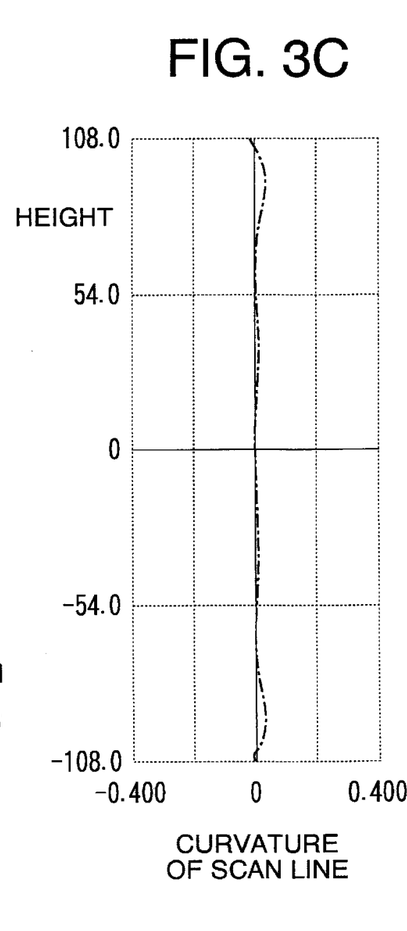
FIG. 3C is a graph showing curvature of a scanning line, in the auxiliary scanning direction, of the reflection type scanning optical system shown in FIGS. 1 and 2.

FIGS. 3A through 3C show a linearity error, curvature of field in the main scanning direction and the auxiliary scanning direction, and curvature of a scanning line in the auxiliary scanning direction, when the above-indicated numerical structure is applied to the scanning optical system 100 shown in FIG. 1. In the respective graphs, the ordinate shows an image height (the distance in the main scanning direction from the optical axis on the drawing surface 5) and the abscissa shows amounts of aberrations (unit: mm).

EXAMPLE 2

Figure 4:
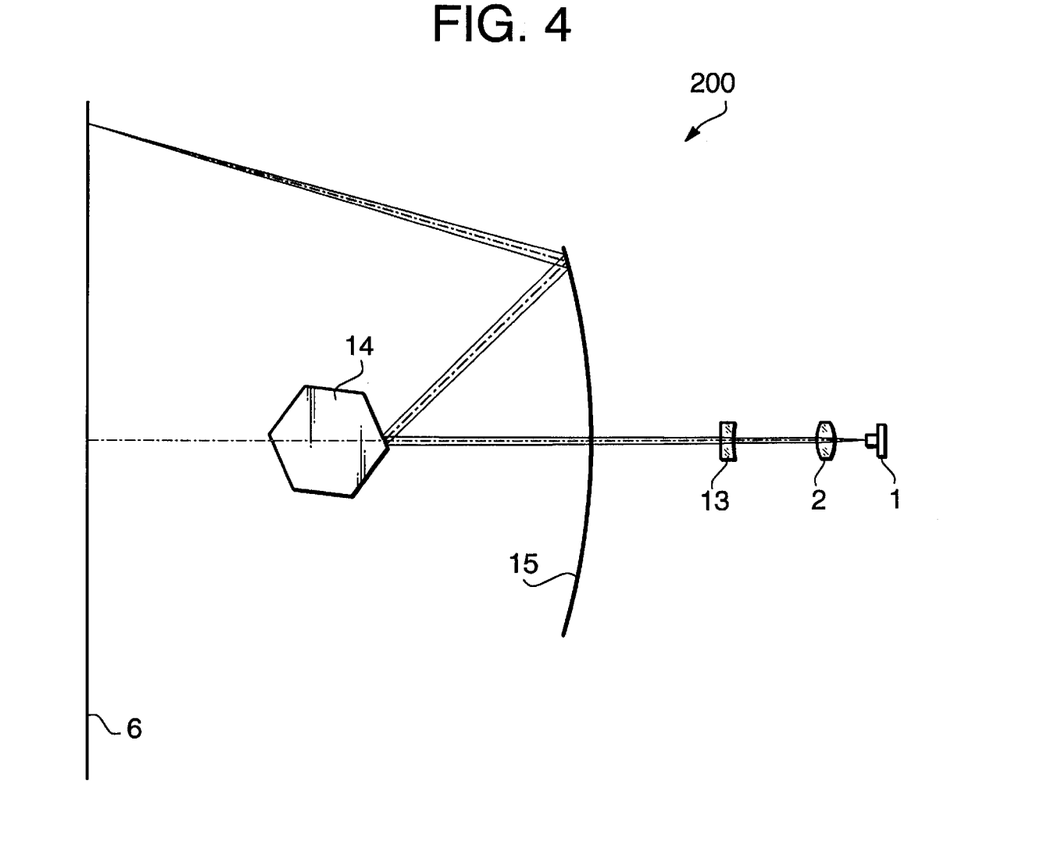
FIG. 4 is a plan view, showing a main scanning plane, of a reflection type scanning optical system according to a second embodiment of the invention.
Figure 5:
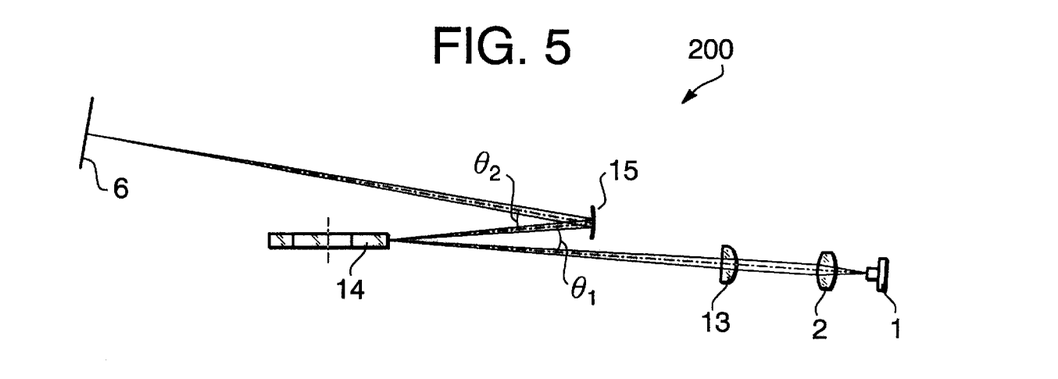
FIG. 5 is a side view, showing an auxiliary scanning plane, of the reflection type scanning optical system shown in FIG. 4.

FIG. 4 is a plan view, showing a main scanning plane, of a reflection type scanning optical system 200 according to a second embodiment to which a numerical structure of example 2 is applied, and FIG. 5 is a side view, showing an auxiliary scanning plane, of the reflection type scanning optical system 200. In the drawings and description hereinafter, the same reference numerals are assigned to members of the optical system 200 which are similar to those employed in the optical system 100.

In the optical system 200, the cylindrical lens 3 and the curved mirror 5 of the optical system 100 are replaced with a toric lens 13 and a curved mirror 15, respectively. In the optical system 200, the toric lens 13 has a weak negative power in the main scanning direction. Power of the toric lens 13 in the auxiliary scanning direction is the same as the power of the cylindrical lens 3 of the scanning optical system 100 described above. Therefore, the light passed through the toric lens 3a is incident on the curved mirror 15 as a weak diverging light in the main scanning direction and as a strongly diverging light in an auxiliary scanning direction.

Table 3 shows a numerical structure of the second example of the reflection type scanning optical system 200 on the scanning surface side of the toric lens 13.

In Table 3, ry represents a radius of curvature in the main scanning direction, rz represents a radius of curvature in the auxiliary scanning direction, d represents a distance between surfaces on an optical axis, and n represents a refractive index at a wavelength of 780 nm.

In Table 3, surface numbers 1 and 2 represent the toric lens 13, a surface number 3 represents the polygonal mirror 4 and a surface number 4 represents the curved mirror 15.

Further, in Table 3, the radius of curvature ry of the curved mirror 15 in the main scanning direction is that on the optical axis.

TABLE 3

| Surface # | ry | rz | d | n |
|---|---|---|---|---|
| 1 | −80.000 | 55.424 | 2.000 | 1.48617 |
| 2 | ∞ | ∞ | 113.000 | |
| 3 | ∞ | ∞ | 70.000 | |
| 4 | −228.200 | * | 169.547 | |

The shape of the reflection surface of the curved mirror 15 is defined by the formula (3). In example 2, the conical coefficient K is O. the curvature c is $1/ry=4.38\times10^{-03}$, and values of the coefficients $B_{m,n}$ are shown in Table 4.

TABLE 4

| $B_{m,n}$ | n = 0 | n = 1 | n = 2 | n = 3 | n = 4 |
|---|---|---|---|---|---|
| m = 0 | 0.00 | 0.00 | $-2.80 \times 10^{-03}$ | 0.00 | $5.20 \times 10^{-07}$ |
| m = 2 | $-1.30 \times 10^{-05}$ | $-3.80 \times 10^{-06}$ | $-7.20 \times 10^{-08}$ | 0.00 | $3.00 \times 10^{-11}$ |
| m = 4 | $1.80 \times 10^{-08}$ | $1.20 \times 10^{-10}$ | $7.60 \times 10^{-12}$ | 0.00 | $-1.40 \times 10^{-14}$ |
| m = 6 | $-6.00 \times 10^{-13}$ | $-8.80 \times 10^{-14}$ | $1.30 \times 10^{-15}$ | 0.00 | $-7.00 \times 10^{-19}$ |
| m = 8 | $2.50 \times 10^{-16}$ | $2.50 \times 10^{-17}$ | $-2.10 \times 10^{-18}$ | 0.00 | $2.30 \times 10^{-21}$ |
| m = 10 | $-5.00 \times 10^{-20}$ | $-2.60 \times 10^{-21}$ | $3.90 \times 10^{-22}$ | 0.00 | 0.00 |
| m = 12 | $3.50 \times 10^{-24}$ | 0.0 | 0.0 | 0.00 | 0.00 |

Figure 6A:
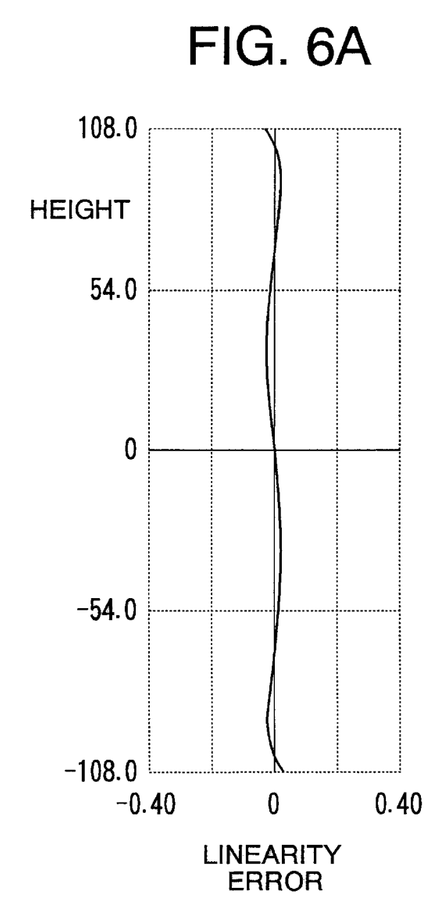
FIG. 6A is a graph showing linearity error.
Figure 6B:
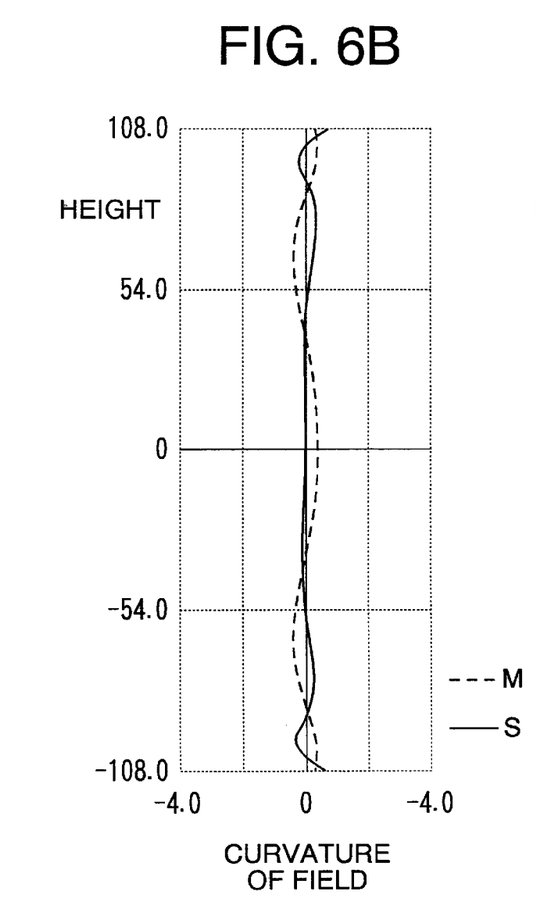
FIG. 6B is a graph showing curvature of field in a main scanning direction and an auxiliary scanning direction.
Figure 6C:
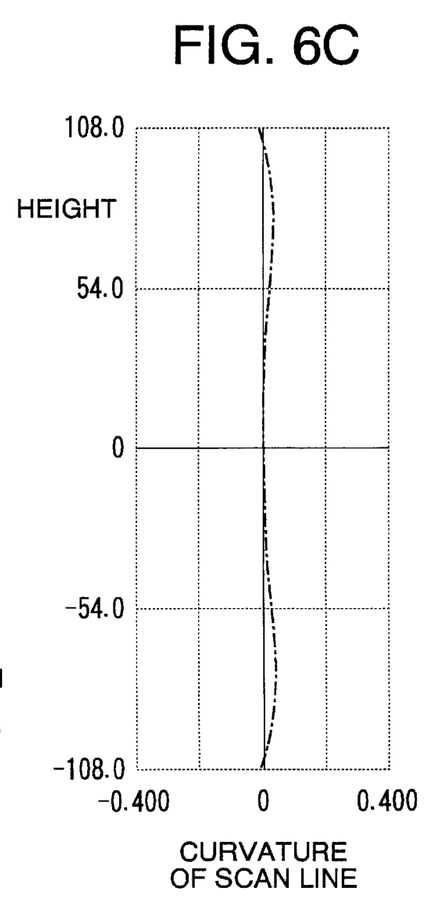
FIG. 6C is a graph showing curvature of a scanning line, in the auxiliary scanning direction, of the reflection type scanning optical system shown in FIGS. 4 and 5.

FIGS. 6A through 6C show a linearity error, curvature of field in the main scanning direction and the auxiliary scanning direction, and curvature of a scanning line in the auxiliary scanning direction, when the above-indicated numerical structure is applied to the scanning optical system 200. In the respective graphs, the ordinate shows an image height (the distance in the main scanning direction from the optical axis on the drawing surface 15) and the abscissa shows amounts of aberrations (unit: mm).

EXAMPLE 3

Figure 7:
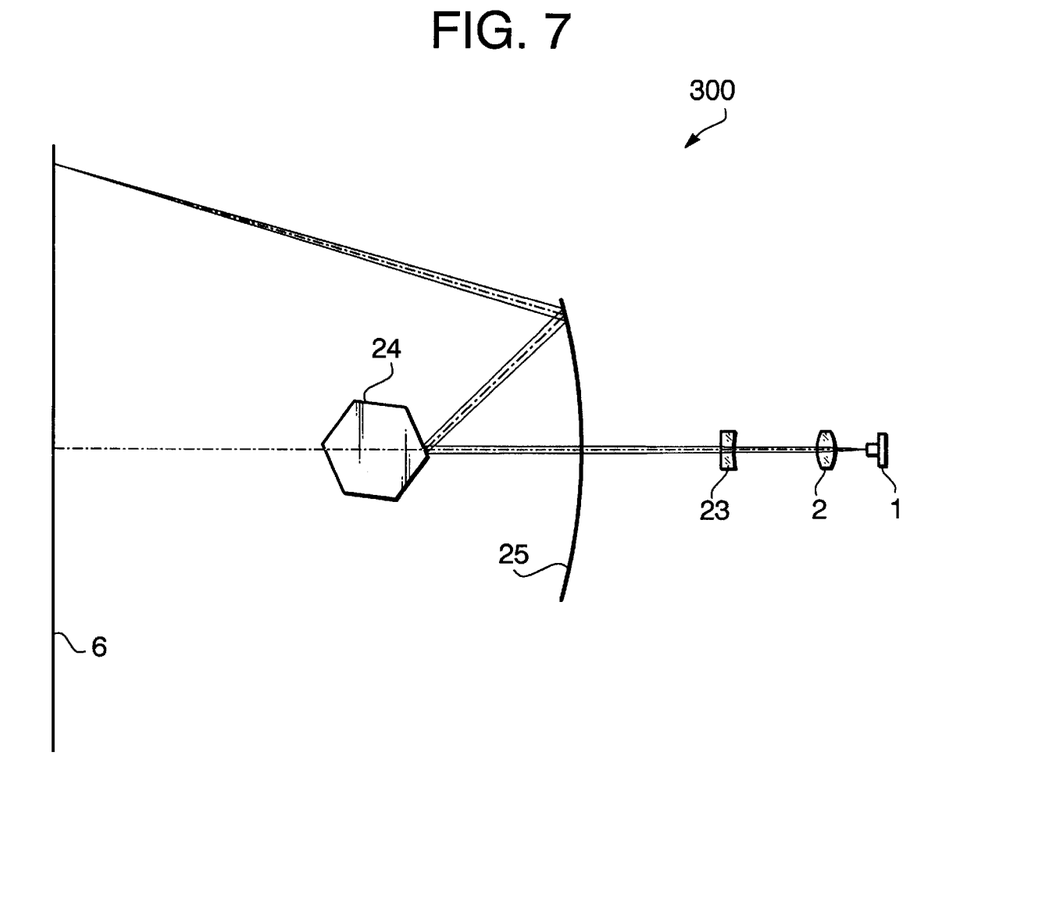
FIG. 7 is a plan view, showing a main scanning plane, of a reflection type scanning optical system according to a third embodiment of the invention.
Figure 8:
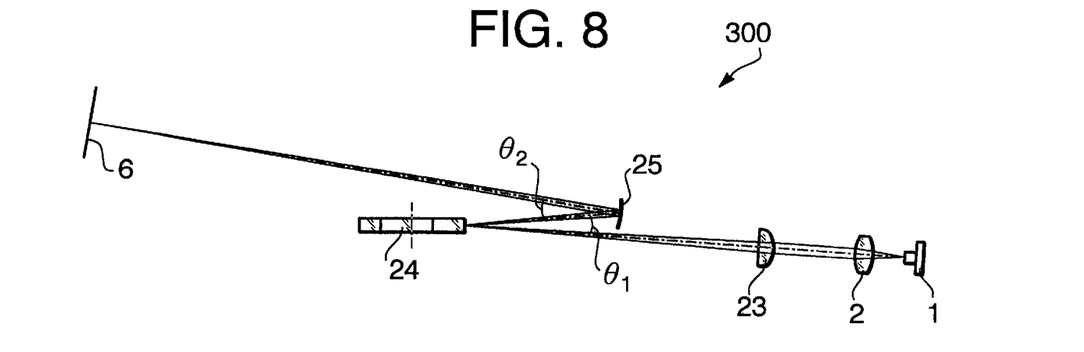
FIG. 8 is a side view, showing an auxiliary scanning plane, of the reflection type scanning optical system shown in FIG. 7.

FIG. 7 is a plan view, showing a main scanning plane, of a reflection type scanning optical system 300 according to a third embodiment to which numerical structure of example 3 is applied, and FIG. 8 is a side view, showing an auxiliary scanning plane, of the reflection type scanning optical system 300. In the drawings and description hereinafter, the same reference numerals are assigned to members of the optical system 300 which are similar to those employed in the optical system 100.

In the optical system 300, the cylindrical lens 3, the polygonal mirror 4, and the curved mirror 5 of the optical system 100 are replaced with a toric lens 23, a polygonal mirror 24 and a curved mirror 25, respectively. In the optical system 300, the toric lens 23 has a weak negative power in the main scanning direction, while the toric lens 23 converges a beam passed therethrough in the auxiliary scanning direction so that a line like image is formed in the vicinity of the reflection surface of the polygonal mirror 24. Further, the reflection surfaces of the polygonal mirror 24 are formed to be cylindrical surfaces each having a negative power in the main scanning direction. With this configuration, the light passed through the toric lens 23 is incident on the curved mirror 25 as a weak diverging light in the main scanning direction, and as a strongly diverging light in an auxiliary scanning direction.

Table 5 shows a numerical structure of the third example of the reflection type scanning optical system 300 from the toric lens 23 to the curved mirror 25.

In Table 5, ry represents a radius of curvature in the main scanning direction, rz represents a radius of curvature in the auxiliary scanning direction, d represents a distance between surfaces on an optical axis, and n represents a refractive index at a wavelength of 780 nm.

In Table 5, surface numbers 1 and 2 represent the toric lens 23, a surface number 3 represents the polygonal mirror 24 and a surface number 4 represents the curved mirror 25. Further, in Table 5, the radius of curvature ry of the curved mirror 25 in the main scanning direction is that on the optical axis.

TABLE 5

| Surface # | ry | rz | d | n |
|---|---|---|---|---|
| 1 | −85.100 | 55.958 | 2.000 | 1.48617 |
| 2 | ∞ | ∞ | 113.000 | |
| 3 | 600.000 | ∞ | 60.000 | |
| 4 | −201.750 | * | 196.490 | |

The shape of the reflection surface of the curved mirror 25 is defined by the formula (3). In example 3, the conical coefficient K is 0, the curvature c is $1/ry=4.96=10^{-03}$, and values of the coefficients $B_{m,n}$ are shown in Table 6.

TABLE 6

| $B_{m,n}$ | n = 0 | n = 1 | n = 2 | n = 3 | n = 4 |
|---|---|---|---|---|---|
| m = 0 | 0.00 | 0.00 | $-2.97 \times 10^{-03}$ | $8.25 \times 10^{-06}$ | $5.10 \times 10^{-07}$ |
| m = 2 | $-1.60 \times 10^{-05}$ | $3.90 \times 10^{-06}$ | $-7.99 \times 10^{-08}$ | $4.05 \times 10^{-09}$ | $7.00 \times 10^{-11}$ |
| m = 4 | $3.10 \times 10^{-08}$ | $1.40 \times 10^{-09}$ | $-1.24 \times 10^{-12}$ | $-1.10 \times 10^{-12}$ | $1.00 \times 10^{-14}$ |
| m = 6 | $-8.20 \times 10^{-13}$ | $-9.50 \times 10^{-13}$ | $2.40 \times 10^{-14}$ | $-6.30 \times 10^{-16}$ | $2.00 \times 10^{-17}$ |
| m = 8 | $4.00 \times 10^{-16}$ | $3.00 \times 10^{-16}$ | $-1.55 \times 10^{-17}$ | $3.7 \times 10^{-19}$ | $1.40 \times 10^{-20}$ |
| m = 10 | $-1.20 \times 10^{-19}$ | $-3.60 \times 10^{-20}$ | $2.82 \times 10^{-21}$ | 0.00 | 0.00 |
| m = 12 | $1.25 \times 10^{-23}$ | 0.0 | 0.0 | 0.00 | 0.00 |

Figure 9A:
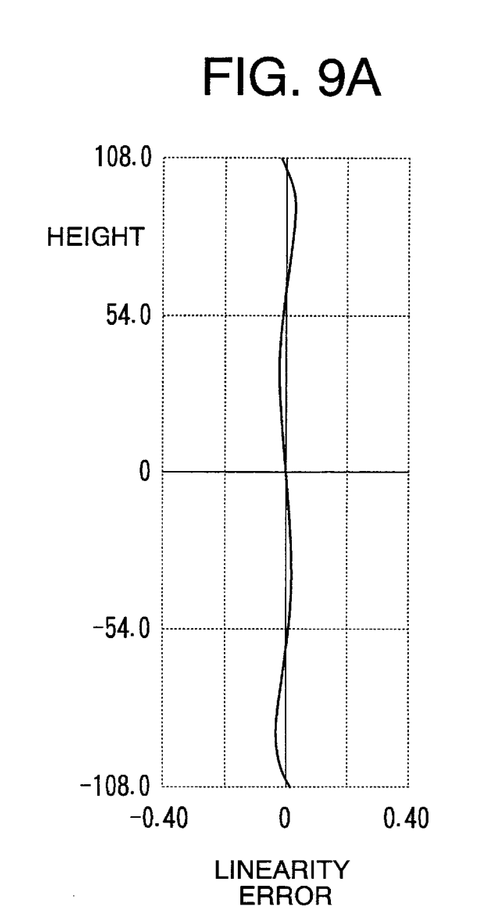
FIG. 9A is a graph showing a linearity error.
Figure 9B:
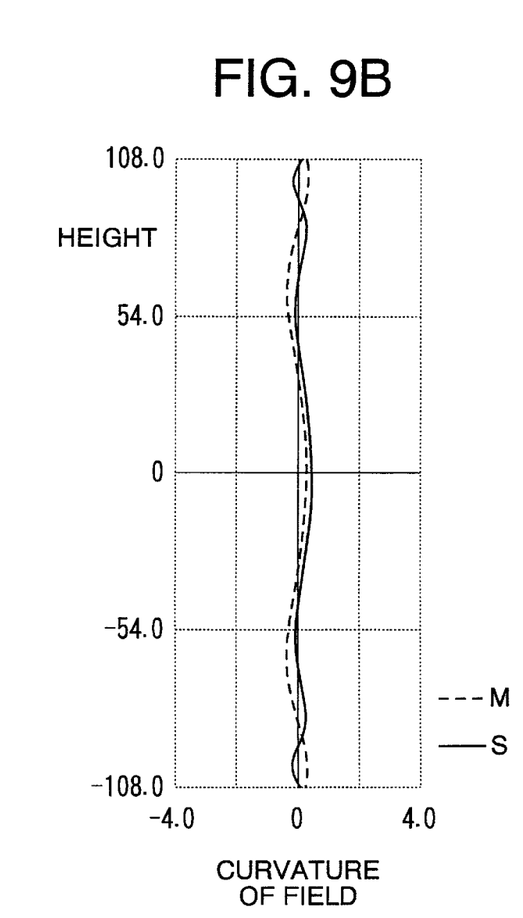
FIG. 9B is a graph showing curvature of field in a main scanning direction and an auxiliary scanning direction.
Figure 9C:
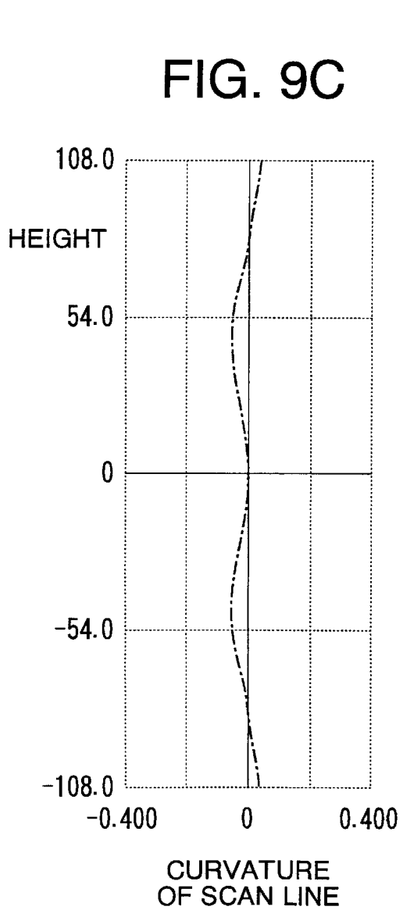
FIG. 9C is a graph showing curvature of a scanning line, in the auxiliary scanning direction, of the reflection type scanning optical system shown in FIGS. 7 and 8.

FIGS. 9A through 9C show a linearity error, curvature of field in the main scanning direction and the auxiliary scanning direction, and curvature of a scanning line in the auxiliary scanning direction, when the above-indicated numerical structure is applied to the scanning optical system 300. In the respective graphs, the ordinate shows an image height (the distance in the main scanning direction from the optical axis on the drawing surface 25) and the abscissa shows amounts of aberrations (unit: mm).

Table 7 shows the condition (1) of each numerical example, and Table 8 shows the condition (13) of each numerical example. As indicated in Table 7 and Table 8, all of the examples 1–3 satisfy the conditions (1) and (13).

TABLE 7

|  | P | 0.8P | Condition (1) |
|---|---|---|---|
| Example 1 | 84 | 67.2 | 0.017 |
| Example 2 | 70 | 56.0 | 0.012 |
| Example 3 | 60 | 48.0 | 0.011 |

TABLE 8

|  | r | $B_{2,0}$ | rm' | \|P/rm'\| |
|---|---|---|---|---|
| Example 1 | -270.910 | $-8.77 \times 10^{-06}$ | -269.629 | 0.312 |
| Example 2 | -228.200 | $-1.30 \times 10^{-05}$ | -226.854 | 0.309 |
| Example 3 | -201.750 | $-1.60 \times 10^{-05}$ | -200.456 | 0.299 |

As described above, according to the present invention, the curved mirror is formed to have the positive power in both the main and auxiliary scanning directions, and the shape thereof is made asymmetric in the auxiliary scanning direction with respect to the reference straight line extending in the main scanning direction and intersecting the optical axis, an excellent optical performance can be obtained only a single curved mirror is provided, instead of an fθ lens, between the polygonal mirror and the surface to be scanned.

The present disclosure relates to a subject matter contained in Japanese Patent Application No. HEI 09-202246, filed on Jul. 11, 1997, which is expressly incorporated herein by reference in its entirety.

What is claimed is:

1. A scanning optical system comprising:

a light source that emits a light beam;

a deflector that deflects said light beam emitted by said light source to scan along a main scanning direction;

a single mirror that reflects said light beam deflected by said deflector towards a surface to be scanned, said single mirror being arranged such that said light beam deflected by said deflector and is incident on said single mirror and a light beam reflected by said single mirror forms a predetermined angle in the auxiliary scanning direction, said single mirror being formed to have a positive power both in said main scanning direction and in said auxiliary scanning direction, and a shape of said single mirror being asymmetric in said auxiliary scanning direction with respect to a reference line which extends in said main scanning direction and intersects an optical axis thereof, wherein when a three-dimensional coordinate system defined by a y-axis extending in the main scanning direction, a z-axis extending in the auxiliary scanning direction, and an x-axis orthogonal to said y-axis and z-axis is given, and when a sag amount, which represents a reflection surface of said mirror, in said x-axis direction with respect to a y-z plane is expressed by a function f (y, z) with respect to y and z coordinates, a condition:

$$0.005 < |g(0.8P,0) - g(0.0)| < 0.025$$

is satisfied, wherein $$g(y, z) = \frac{\partial}{\partial z} f(y, z),$$

and wherein, P represents a distance between said deflector and said single mirror.

2. The scanning optical system according to claim 1, wherein said function f(y, z) is a two-dimensional polynomial with respect to y and z.

3. The scanning optical system according to claim 1, wherein said light beam emitted from said light source and incident on said deflector is a parallel beam in said main scanning direction.

4. The scanning optical system according to claim 1, wherein said light beam emitted from said light source and incident on said deflector is a diverging beam in said main scanning direction.

5. The scanning optical system according to claim 1, wherein said deflector is a polygonal mirror having a plurality of reflecting surfaces each of which is formed to have a curved shape.

6. The scanning optical system according to claim 5, wherein each of said reflecting surfaces is a cylindrical surface having a curvature only in the main scanning direction.

7. The scanning optical system according to claim 6, wherein each of said reflecting surface has a negative power in said main scanning direction.

8. The scanning optical system according to claim 1, wherein a condition:

$$0.2 < \left|\frac{P}{rm'}\right| < 0.4$$

is satisfied, wherein, P represents a distance from said deflector to said single mirror, and rm' represents an effective radius of curvature, in the paraxial region, of the said single mirror in said main scanning direction, rm' being defined by an equation:

$$\frac{1}{rm'} = \frac{1}{rm} + 2A_2$$

wherein, a sag amount in said x-axis direction is expressed by a function f(y, z) which is a two-dimensional polynomial with respect to y and z, $A_2$ is a coefficient of a term of $y^2$ of said function f(y, z), and rm represents a radius of curvature, in the paraxial region, of said curved mirror in said main scanning direction.

* * * * *